(12) United States Patent
Alaze

(10) Patent No.: US 7,789,639 B2
(45) Date of Patent: Sep. 7, 2010

(54) PISTON PUMP

(75) Inventor: Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 505 days.

(21) Appl. No.: 11/718,450

(22) PCT Filed: Oct. 11, 2005

(86) PCT No.: PCT/EP2005/055152

§ 371 (c)(1),
(2), (4) Date: May 2, 2007

(87) PCT Pub. No.: WO2006/048366

PCT Pub. Date: May 11, 2006

(65) Prior Publication Data

US 2009/0068039 A1    Mar. 12, 2009

(30) Foreign Application Priority Data

Nov. 2, 2004    (DE) ........................ 10 2004 052 817

(51) Int. Cl.
*F04B 19/00* (2006.01)
(52) U.S. Cl. .................. 417/470; 417/471; 417/549; 417/569
(58) Field of Classification Search .......... 417/470, 417/549, 569, 552, 471
See application file for complete search history.

(56) References Cited

U.S. PATENT DOCUMENTS

| 4,846,216 A | * | 7/1989 | Raymond | .............. 137/516.27 |
| 5,113,898 A | * | 5/1992 | White et al. | .............. 137/454.5 |
| 5,123,819 A | | 6/1992 | Schuller et al. | |
| 5,567,135 A | * | 10/1996 | Mueller et al. | .............. 417/549 |
| 5,893,389 A | * | 4/1999 | Cunningham | .......... 137/516.27 |
| 6,126,418 A | * | 10/2000 | Sinnl | ........................ 417/470 |
| 6,171,083 B1 | * | 1/2001 | Schuller | ..................... 417/549 |
| 6,514,055 B1 | * | 2/2003 | Schuller | ..................... 417/460 |
| 2002/0155008 A1 | | 10/2002 | Hauser et al. | |
| 2003/0021709 A1 | | 1/2003 | Okuya et al. | |
| 2004/0166004 A1 | * | 8/2004 | Schmitt et al. | .............. 417/470 |

FOREIGN PATENT DOCUMENTS

| DE | 100 15 295 A1 | 10/2001 |
| JP | 2004-52731 | 2/2004 |
| JP | 2005-240599 | 8/2005 |

OTHER PUBLICATIONS

Behrendt R., "Geraueuscharme und Leckagesichere pumpen", O+P Olhydraulik und Pneumatik, vol. 47, No. 1, pp. 26-27, Jan. 2003, XP001184481, ISSN: 0341-2660.

* cited by examiner

*Primary Examiner*—Devon C Kramer
*Assistant Examiner*—Peter J Bertheaud
(74) *Attorney, Agent, or Firm*—Ronald E. Greigg

(57) ABSTRACT

A piston pump is proposed, having a pump housing, in which housing a pump piston is guided axially movably, so that upon an actuation of the pump piston, a fluid is pumped from an intake side to a compression side, via a pump chamber bordering on the pump piston, the compression side being provided with an outlet valve, which is preceded by a damping element.

4 Claims, 1 Drawing Sheet

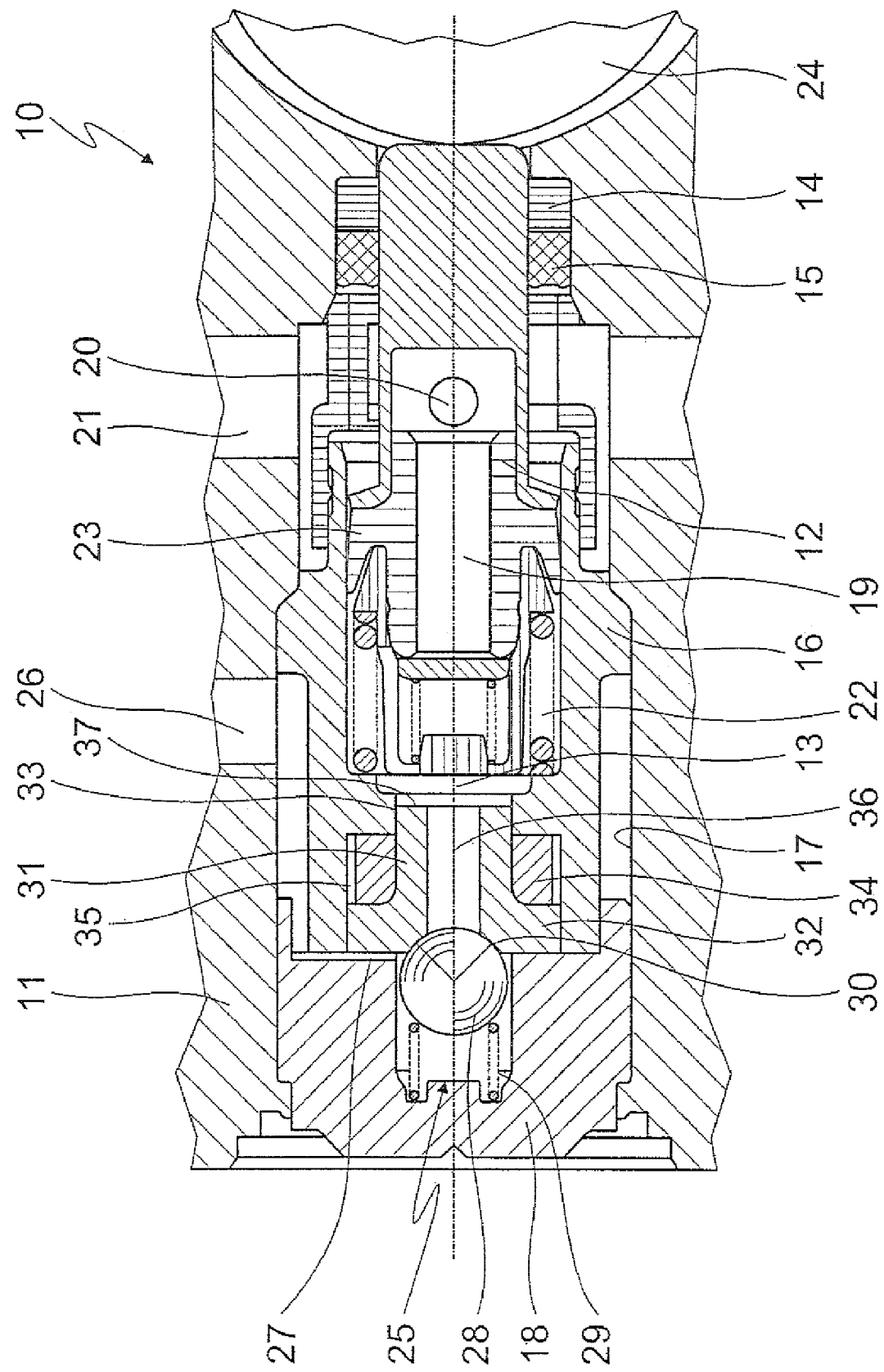

PISTON PUMP

CROSS-REFERENCE TO RELATED APPLICATION

This application is a 35 USC 371 application of PCT/EP 2005/055152 filed on Oct. 11, 2005.

BACKGROUND OF THE INVENTION

1. Field of the Invention

The invention is directed to an improved piston pump.

2. Description of the Prior Art

One piston pump of the type with which this invention is concern is known from German Patent Disclosure DE 100 15 295 A1, for example, and is a component of an electrohydraulic brake system of a motor vehicle. The known piston pump has a pump housing, in which a pump piston is axially movably guided, so that a fluid is pumped from an intake side of the pump to a compression side of the pump via a pump chamber bordering on the pump piston. An outlet valve, which is embodied as a check valve and is integrated into an outlet valve cap, is located on the compression side of the pump.

Upon opening of the outlet valve, excessive increases in pressure on the compression side can occur, which in turn lead to a possibly annoying development of noise.

SUMMARY AND ADVANTAGES OF THE INVENTION

The piston pump of the invention having a damping element preceding the outlet valve has the advantage that excessive pressure increases on the compression side caused by switching events of the outlet valve can be effectively reduced, and the damping element, which in a noise-related expulsion operation of the piston pump, in other words when fluid is being pumped to the compression side of the piston pump, is subjected only to a pressure that results from the difference between the pressure prevailing in the pump chamber and the operating pressure prevailing on the compression side, is operative in all relevant pressure ranges, and in particular even at pressures above approximately 50 bar.

The piston pump of the invention can be used in particular as a pump in a motor vehicle brake system and in this case can serve to control the pressure in wheel brake cylinders. The piston pump of the invention is used for instance in a brake system with wheel slip control (ABS or ESP) and/or in an electrohydraulic brake system (EHB). The pump then serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or VDC or EHB). The pump can also serve to fill a reservoir in the brake system. With wheel slip control, locking of the wheels in a braking event (ABS) and/or spinning of the driven wheels of the vehicle (TCS) can be averted. In a brake system serving as a steering aid (VDC), a brake pressure is built up in one or more wheel brake cylinders independently of an actuation of the brake pedal or gas pedal, for instance to prevent the vehicle from breaking out of the lane chosen by the driver. If the pump is used in conjunction with an electrohydraulic brake system (EHB), the pump pumps the brake fluid into the wheel brake cylinder or cylinders if an electric brake pedal sensor detects an actuation of the brake pedal.

In a preferred embodiment of the piston pump of the invention, the damping element includes a damping disk, which in particular is annular, and which is braced on a spring-elastic component that in turn is braced on a fixed component, for instance on part of the pump housing or on a bushing for the pump piston. A free end face of the damping disk preferably points in the axial direction of the piston pump and in the direction of the outlet valve. This face represents the effective surface area of the damping element.

To assure good guidance of the damping element, the damping disk is preferably an annular-collar-like component of a tubular part that is preferably guided in a bushing for the pump piston. Alternatively, the tubular part may also be guided in a housing part or some other fixed component of the pump.

To achieve the best possible damping action, the damping element is expediently located in the immediate vicinity of the outlet valve. In particular, the damping element can form a valve seat for a valve closing member of the outlet valve.

In a special embodiment of the piston pump of the invention, the spring-elastic component for the damping element is fastened between the damping element and a bushing for the pump piston.

In principle, the spring-elastic component may be embodied with an arbitrary construction. All that must be assured is that the damping element be prestressed by the spring-elastic component at right angles to its effective surface area. However, it is advantageous to embody the spring-elastic component as a rubber element, which can also take on sealing tasks. If the spring-elastic component is embodied in some other way, then additional sealing elements may have to be disposed in the region of the damping element.

The rubber element may be embodied annularly and contact the tubular part that has the damping disk in a sealing manner or by positive engagement, and in the radial direction it may be defined by an annular chamber or annular gap.

BRIEF DESCRIPTION OF THE DRAWING

Further advantages and advantageous features of the subject of the invention can be learned from the description contained herein below, taken with the sole drawing FIGURE which shows a longitudinal section through a piston pump of an electrohydraulic brake system.

DESCRIPTION OF THE PREFERRED EMBODIMENT

In the drawing, a piston pump 10 is shown, which is integrated into a hydraulic block that forms a pump housing 11. The hydraulic block is a component of an electrohydraulic vehicle brake system and besides the piston pump 10 optionally includes further piston pumps of identical construction as well as hydraulic components such as magnet valves or pressure reservoirs, which may be hydraulically interconnected with one another and with the piston pump 10 shown in the drawing.

The piston pump 10 is provided with a pump piston 12, constructed in multiple parts, which, on an end remote from a positive displacement chamber or pump chamber 13, is guided into the pump housing 11I via a guide ring 14 and is sealed off by a sealing ring 15. An end of the pump piston 12 toward the positive-displacement chamber 13 is guided via an annular collar 23 in a bushing 16, which is fitted into a bore 17 in the housing 11 and is fixed by means of a so-called outlet valve cap 18, which also acts as a closure part for the pump 10 that is integrated into the hydraulic block.

The pump piston 12 has a blind-bore-like axial conduit 19, which communicates via transverse bores 20 with an inlet conduit 21 that forms an intake side of the piston pump 10, so that upon intake, fluid from the inlet conduit 21 can be pumped via the transverse bore 20 and the axial conduit 19 into the positive-displacement chamber 13.

The pump piston 12 is furthermore prestressed in the direction remote from the positive-displacement chamber 13 by means of a restoring spring 22. The restoring spring 22 presses the pump piston 12, via the annular collar 23 serving to guide it in the bushing 16, in the axial direction counter to an eccentric element 24 which can be driven to rotate by an electric motor and which serves to drive the piston 12, causing the piston to experience a reciprocating motion.

An outlet valve 25 embodied as a check valve is disposed in the outlet valve cap 18, it controls a fluid flow between the positive-displacement chamber 13 and an outlet conduit 26, forming a compression side, and to that end is provided, on a face end toward the bushing 16, with a connecting conduit 27 that leads to the outlet conduit 26.

The outlet valve 25 includes a spherical valve closing member 28, which is prestressed in the closing direction by means of a spiral spring 29 and cooperates with a valve seat 30 embodied as a conical seat.

The valve seat 30 is embodied on a tubular part 31 that has an annular collar 32, which forms a damping disk and is guided in the radial direction in the bushing 16. With its region of reduced diameter, the tubular part 31 is guided axially movably on a guide 33 of the bushing 16 for the pump piston 12.

A spring-elastic component 34 embodied as a rubber element is fastened between the annular collar 32 and the guide region 33 of the bushing 16; this component embraces the tubular part 31 by positive engagement and, as shown in the drawings, is defined radially outward by an annular chamber or gap 35, so that the spring- or rubber-elastic component 34 is compressible in the axial direction of the piston pump 10 upon an axial motion of the tubular part 31 that takes place in the direction of the eccentric element 24 and away from the outlet valve 25.

The tubular part 31 has an interior 36, which adjoins the positive-displacement chamber 13 that borders on the pump piston 12, and by way of which the fluid is pumped in a pumping operation to the connecting conduit 27 in the outlet valve cap 18.

The piston pump shown in the drawing functions as described below.

During an intake phase, the pump piston 12 is axially displaced by the restoring spring 22 in the direction away from the outlet valve 25, the direction being predetermined by a rotary motion of the eccentric element 24, so that fluid is pumped into the positive-displacement chamber 13 via the transverse bores 20 and the axial conduit 19 of the pump piston 12. During the intake phase, the annular collar 32, acting as a damping disk, of the tubular part 31 is pressed in the direction of the pump piston 12, or of the positive-displacement chamber 13, by the pressure acting on the valve closing member 28, which represents an operating pressure of the piston pump 10.

Any fluid contained in the annular chamber 35 is expelled during the intake phase via a throttle gap located between the annular collar 32 and the bushing 16.

Upon a further rotation of the eccentric element 24, the pump piston 12 is pressed in the direction of the outlet valve 25, so that a compression phase is initiated, in which fluid from the positive-displacement chamber 13 is pumped to the outlet conduit 26. Initially, the tubular part 31, as a result of the pressure acting on the face end 37 remote from the outlet valve 25, moves in the direction of the outlet valve cap 18. In the process, the outlet valve 25 opens, and pressure fluctuations that occur in response and that may be above the operating pressure can be damped by a motion of the tubular part 31 in the direction of the pump piston 12.

The foregoing relates to a preferred exemplary embodiment of the invention, it being understood that other variants and embodiments thereof are possible within the spirit and scope of the invention, the latter being defined by the appended claims.

The invention claimed is:

1. In a piston pump, having a pump housing, in which housing a pump piston is guided axially movably, so that upon an actuation of the pump piston, a fluid is pumped from an intake side to a compression side, via a pump chamber bordering on the pump piston, the compression side being provided with an outlet valve, the improvement comprising a damping element preceding the outlet valve, the damping element being guided axially movably in a bushing, the damping element comprises a tubular member having an annular-collar-like component and a cylindrical component having a diameter that is smaller than the annular-collar-like component, a spring-elastic component fastened between the annular-collar-like component of the tubular member and a guide region of the bushing, the spring-elastic component embracing the cylindrical component of the tubular member by positive engagement and an annular chamber or gap defined radially outward of the spring-elastic component between the spring-elastic component and the bushing.

2. The piston pump as defined by claim 1, wherein the damping element forms a valve seat for a valve closing member of the outlet valve.

3. The piston pump as defined by claim 1, wherein the spring-elastic component is formed of a rubber element.

4. The piston pump as defined by claim 1, wherein the spring-elastic component is compressible in the axial direction of the piston pump upon an axial motion of the damping element that takes place in the direction away from the outlet valve.

* * * * *